July 25, 1967     F. D. WERNER ET AL     3,332,116
ELASTOMER TENSION CARRYING DEVICE
Filed March 31, 1965
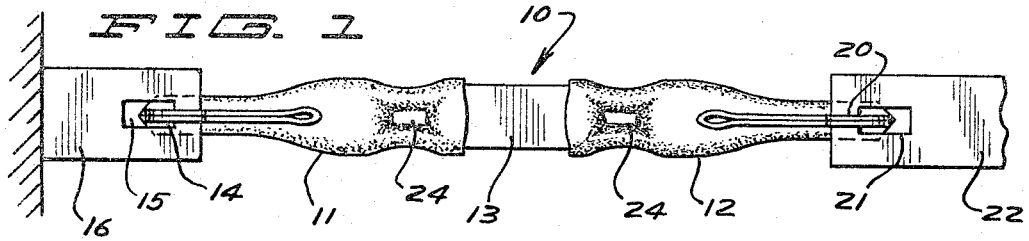
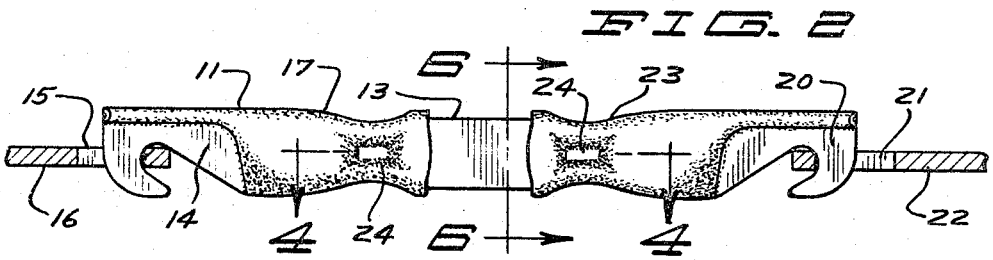
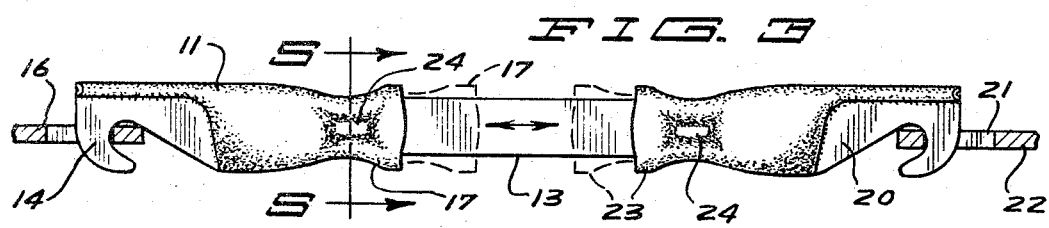
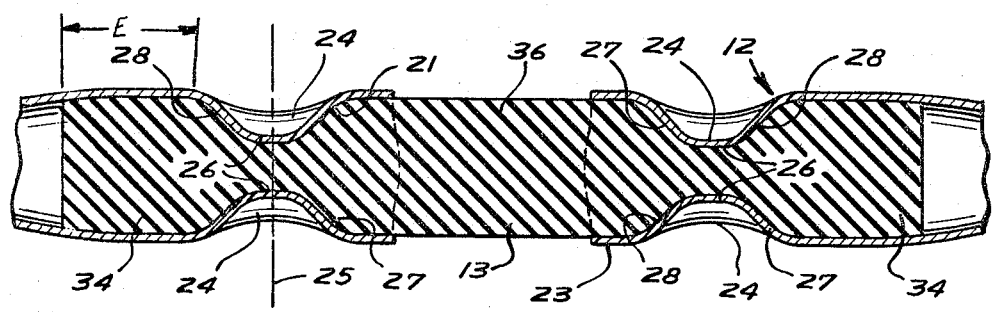
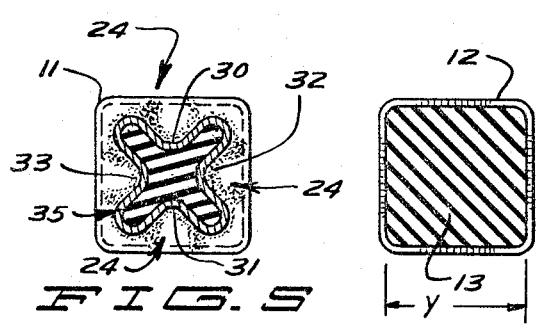
INVENTORS
FRANK D. WERNER
BY PAUL S. PETERSEN
Dugger Johnson & Westman
ATTORNEYS United States Patent Office 3,332,116
Patented July 25, 1967

3,332,116
ELASTOMER TENSION CARRYING DEVICE
Frank D. Werner, Minneapolis, and Paul S. Petersen, Minnetonka, Minn., assignors to Rosemount Engineering Company, Minneapolis, Minn., a corporation of Minnesota
Filed Mar. 31, 1965, Ser. No. 444,183
4 Claims. (Cl. 24—123)

ABSTRACT OF THE DISCLOSURE

The disclosure herein discloses a tension carrying member having an elastomer for a center section and having a metal end clip that is attached to the ends of the elastomer. The end clip is tubular and has a mating cross section to the cross section of the elastomer. A short distance in from the ends of the clip, the clip is indented into the elastomer to compress it so that the cross sectional area under the indentations is less than the cross sectional area which the elastomer will reach during tension.

---

The present invention has relation to an elastomer member and more particularly to an elastomer member which has end clips thereon for attaching the member to suitable structures for tension loading.

In practice it has been extremely difficult to devise a means for easily attaching a clip or end member onto the end of a length of an elastomer, such as rubber, and insuring that the clip will not come off when it is subjected to tension stresses during use. While vulcanization or adhesives will work in some cases this is not satisfactory for all type of materials and for all applications.

Previously, when the end members have been "clinched" onto the ends of the elastomers, extreme difficulty was encountered in obtaining good connections between the elastomer and the end clip. As a result the class of "clinched" end fasteners is almost never attempted with elastomers. The device of the present invention, as disclosed, presents an elastomer which has end clips that are easily attached to the ends thereof, will carry high tension loads, and will not fail in service. The clips will not pull off the elastomers, as commonly happens with previous devices, nor will there be a breakage of the elastomer in the area where the end clips or members are fastened to the elastomer.

It is therefore an object of the present invention to present an elastomer for tension loading which has end clips attached thereto in a manner that will not fail during use and does not require vulcanization or adhesive for attachment.

In the drawings:

FIG. 1 is a fragmentary top plan view of a tension carrying member comprising an elastomer having end clips attached thereto according to the present invention;

FIG. 2 is a side elevational view of the device of FIG. 1 with parts in section and parts broken away;

FIG. 3 is a side elevational view of the device of FIG. 1 showing the device in an elongated or stretched position;

FIG. 4 is a fragmentary enlarged sectional view taken as on line 4—4 in FIG. 2;

FIG. 5 is an enlarged sectional view taken as on line 5—5 in FIG. 3; and

FIG. 6 is a sectional view taken as on line 6—6 in FIG. 2.

Referring to the drawings and the numerals of reference thereon, FIG. 1 illustrates the top plan view of a tension loaded member 10 which has a first end clip 11 and a second end clip 12, which as shown are substantially identical in construction. The tension member also includes a center elastomer strip or member 13, which is capable of being stressed under tension and which will return to its normal unstressed condition when the tension load thereon is released. The first end clip 11 is provided with a hook portion 14 which is inserted into an opening 15 on a retaining bracket 16 which is shown schematically. The clip 11, besides the hook portion, includes a tubular base portion 17 which is closely slidably fitted over a first end of the center elastomer strip or member.

A second clip or end member on the elastomer 13 has a hook portion 20 which is fitted into a provided opening 21 of a movable load bracket or drawbar 22. The load bracket is the movable bracket which is attached to a load member (not shown) which exerts a tension load on the member 10. The elastomer will resist this load. The tension member 10 is designed to resist tension loads applied to the bracket 22.

The tension member can be used in any desired device where tension loads are to be resisted by an elastic device. A typical application is the device used to regulate the amount of force necessary to pivot an ankle cuff portion of a Ski Boot, as shown in the United States patent application of Frank D. Werner et al., entitled Ski Boot Improvements, Ser. No. 444,220, filed on even date herewith, and assigned to the same assignee as this application. The tension member is shown as member 204 in the Werner et al. application above identified.

The clip 12 also has a tubular base portion 23 which is fitted over the second end portion of the elastomer 13. The base portions of the clips are identically constructed. Each of the base portions 17 and 23 is made to have the same cross sectional shape as the elastomer strip 13 and, as shown, this is rectangular. The base portions 23 and 17 are slidably fitted over the ends of the elastomer section 13 and quite closely fit onto this elastomer strip. However, the fit is sliding, as stated previously.

The base portions 23 and 17 are, after being placed on the elastomer, indented with a plurality of indentations illustrated generally at 24 which deform the metal of the base portions 17 and 23 inwardly (the clips are made of a suitable metal). The indentations bear against and squeeze the elastomer 13 positioned within the base portions. As shown, there are four indentations 24 on each of the base portions. The four indentations work well where there is a square or rectangular cross section of the elastomer.

The indentations are symmetrical (or substantially so) about a transverse plane extending through the center of the indentations 24. As shown, the plane represented by the line 25 is perpendicular to the longitudinal axis of the member and bisects the indentations 24 and it is also shown that each of the indentations is bisected by this plane. The indentations each have a maximum depth center portion 26 and end tapered portions 27 and 28, respectively, which taper from the maximum indentation portion 26 to the normal outer surface of the base sections 17 and 23. Further, as shown, the positioning of the indentations themselves is symmetrical about the longitudinal axis of the member. Each indentation 24 faces an indentation 24 on the opposite side of the base section of each clip. This is perhaps best seen in FIG. 5 wherein a first indention 30 is opposed by a second indentation 31 and a third indentation 32 is opposed by a fourth indentation 33.

Also, notice in FIG. 5, that the indentations are symmetrical about planes bisecting them and passing through the longitudinal axis of the elastomer. The positioning of the indentations can be modified, if desired. As shown the indentations are all radiused smoothly to avoid sharp changes in angles which cause stress concentration nd perhaps cutting of the elastomer. The device will break in the center rather than in the end clips under the indentations.

An unstressed end section 34 of the elastomer may be left at each end thereof within the base sections 17 and 23 beyond the indentations. These unstressed end portions if used, help hold the elastomer, because energy must be expended on these portions if they are to be drawn through the indented part of the clamp. Preferably, the end portions 34 should extend far enough beyond the indentations so that it is found that even when the elastomer is under its maximum tension load the end portion will be stressed little or not at all.

The cross sectional area of the elastomer at plane 25 (as also shown in FIG. 5) under the indentations 24 and as indicated generally at 35, must be made less than the minimum cross sectional area of the elastomer under the maximum tension load exerted on it. In other words, the stress level in the cross sectional area 35 after indenting the base portions of the clips will be greater than that in the center portion 36 of the elastomer 13 when the elastomer is under its maximum tension load.

Major factors to be considered are to have a large coefficient of friction between the elastomer and the inner surface of the metal under the indentation; a large peripheral area under the fluted or indented sections to increase the friction between the elastomer and the clip walls; and a large length for the indented section. The clover leaf section gives large peripheral surface in relation to the cross sectional area thereof. Thus the friction coefficient needed is less and/or the indented length is less, than when a shorter peripheral length is used.

When the tension loaded member 10 is subjected to a tension force by moving the clip 22 from some external force, the source of which is not shown, the load will be transferred through the clip 12 and its base section 23 into the indentations 24 and thus into the elastomer. The load will be transferred to the clip 11 and to the stationary bracket 16.

As the elastomer extends it will reduce in cross sectional area, but never to a smaller area than under the indentations, as discussed above. Therefore, there will always remain some outward compressive force under the indentation to cooperate with the friction coefficient and the metal surface area under the indentation, sufficient to prevent the elastomer from sliding out. This is true as long as the cross sectional area at section 35 is less than the minimum cross section of the elastomer under tension, provided adequate friction is provided by the large surface area under the indentation, and a sufficiently high coefficient of friction. The force tending to pull the elastomer out of the end clips is resisted by this friction force between the inner surface of the clamp and outer surface of the elastomer under the indentations.

The distance E from the end of the indentation (where section 28 meets the outer wall of the base section of the clips) to the end surface of the end sections 34 should preferably be at least equal to or greater than the minimum unstressed transverse dimension Y of the elastomer.

The teaching herein is directed to the making of an elastomeric tension member wherein the end clips are attached efficiently. The indentations are made in a manner to maximize the effect of the friction coefficient of the material used, and to keep the length of the indentations short for easy forming. This is done by indenting the clip and at the same time keeping the peripheral length of the elastomer under the indentation substantially equal to the unstressed peripheral length.

The longitudinal length of the section 26 at the maximum indentation is preferrably substantially equal to or greater than one-half of the minimum unstressed transverse dimension of the elastomer. This, together with the reduction of the cross sectional area to less than that which the elastomer reaches during service give a very efficient fastening for the clip.

The fastening utilizes the resiliency of the strip, and its coefficient of friction to great advantage and the indentations are very easy to form.

What is claimed is:

1. An elastic member for carrying tension loads including a strip of material made of an elastic substance, an end clip fitted over at least one end of said strip, a portion of said end clip being tubular and closely fitting the periphery of said strip and surrounding an end portion thereof, a plurality of indentations in said end clip positioned inwardly from the end of said end clip, said indentations reducing the cross sectional size of the portion of the elastic strip surrounded by the tubular portion of said end clip to a cross sectional area less than that which said elastic strip will reach when subjected to its maximum tension load, said reduction of cross sectional area being formed without substantially reducing the peripheral length of the elastic strip, said indentations of said tubular portion of said end clip being spaced from the end surface at the end of the elastic strip to which said clip is attached a distance equal to or greater than the minimum transverse dimension of the strip.

2. The combination as specified in claim 1 wherein the extreme end portion of the strip to which the clip is attached is substantially unstressed when the clip is at rest.

3. The combination as specified in claim 2 wherein said strip has a rectangular cross sectional shape, and said clip has a rectangular tubular portion over the end of the strip, and the tubular portion is provided with four indentations, one engaging each side surface of the elastomer, said indentations being each symmetrical about the same transverse plane extending through the maximum point of penetration of the indentations.

4. A member for carrying tension loads including a strip of material made of an elastomer, and end clip fitted over at least one end of said strip, a portion of said end clip being tubular and adapted to surround the end portion of said strip, said tubular portion of said end clip having an indentation therein which reduces the cross sectional area thereof and of the elastomer fitted therein to an area less than that which said elastic strip will reach when subjected to its maximum tension load, said indentation being formed without substantially changing the peripheral length of the elastomer where the indentation is formed, said indentation having a maximum penetration section extending longitudinally of the strip, and the length of the maximum penetration section being equal to or greater than one half of the minimum unstressed transverse dimension of the strip.

References Cited

UNITED STATES PATENTS

| 2,700,398 | 1/1955 | Green | 24—123 X |
| 2,835,945 | 5/1958 | Hilsinger | 24—123 X |

FOREIGN PATENTS

| 17,686 | 4/1882 | Germany. |

WILLIAM FELDMAN, *Primary Examiner.*

ERNEST SIMONSEN, *Assistant Examiner.*